UNITED STATES PATENT OFFICE.

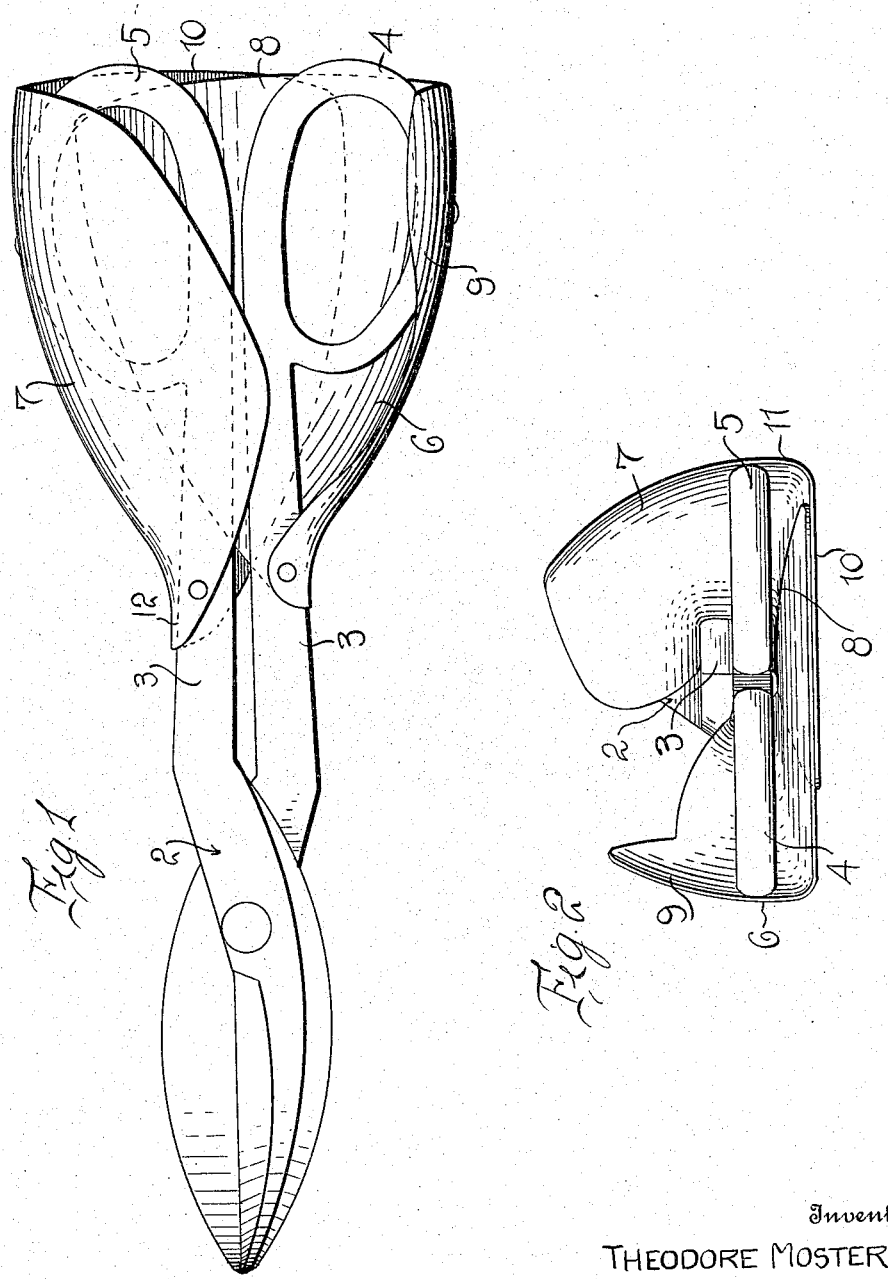

THEODORE MOSTER, OF INDIANAPOLIS, INDIANA.

TINNER'S SHEARS.

1,174,175.        Specification of Letters Patent.        Patented Mar. 7, 1916.

Application filed November 27, 1915. Serial No. 63,832.

*To all whom it may concern:*

Be it known that I, THEODORE MOSTER, a citizen of the United States, residing at Indianapolis, in the county of Marion and State of Indiana, have invented certain new and useful Improvements in Tinners' Shears, of which the following is a specification, reference being had to the accompanying drawings.

My invention relates to shears, and particularly to shears for cutting metal sheets such as are commonly used by tinners, plumbers, and other metal workers.

In the use of ordinary tinners' shears or "snips" as they are called, the edges of the sheet metal being cut are very liable to cut the fingers or hand of the user of the shears, the cut margins of the sheet metal turning upward under the action of the shears and right in the path of movement of the hand.

To avoid this is the object of my invention, and my invention consists, generally speaking, in the provision of shields or guards attached to or forming part of the handles of the shears, these guards being so arranged as to protect the fingers and thumb and protect the lower and upper edge of the hand.

A further object of the invention is to so form these guards that the guards will permit the opening of the shears without uncovering or disclosing any opening through which the tin can pass to cut the hand.

Other objects will appear in the course of the following description.

My invention is illustrated in the accompanying drawings, wherein:

Figure 1 is a side elevation of a pair of shears with my improved finger guards applied thereto; and Fig. 2 is a rear elevation thereof.

Referring to these drawings, 2 designates a pair of tinners' "snips" or shears of the ordinary type and having the shanks 3 formed at their ends with the finger and thumb loops 4 and 5. Attached to the shanks of the shears in any suitable manner, as by being welded or riveted thereto, are the guards 6 and 7. The guard 6 is to guard the thumb of the operator while the guard 7 is to protect the fingers of the operator. The guard 6 is approximately oval in form and extends down the shank 3 to the extremity of the loop 4. The inner edge 8 of the guard 6 approximately conforms to the shape of the lower end of the shank and loop but the outer margin is bent upward, as at 9, so that when the shears are in use this margin 9 will extend across the base of the operator's thumb as well as along the face of the loop 4. The inner margin adjacent the edge 8 extends approximately in a parallel plane to that of the loop 4.

The guard 7 has a portion 10 which is disposed in a plane approximately parallel to that of the shank and loop 5 and a portion 11 which extends almost at right angles to the portion 10 but whose outer margin is deflected gradually inward and toward the blades of the shears so that at the extremity of the guard 7 the guard is formed to embrace the shank, as at 12. The width of the portions 6 and 7 of the two guards is such that when the shear shanks are closed the portions 6 and 7 will overlap and that when the shears are opened to their full extent there will yet be an overlapping of the portions 6 and 7 so that even when the shears are opened to their full extent the fingers and thumb of the operator will be guarded by the two shields. It is to be understood, of course, that the shields or guards are disposed in such spaced relation to the shanks and loops of the shears that the fingers and thumb of the user may be readily inserted in the loops. Preferably the guards or shields are attached to the shanks at the inner extremities of the guards and also attached each to the corresponding loop 4 or 5 at one or a plurality of points.

While I have illustrated a form of guard or protector which I have found to be thoroughly effective in practice, I do not wish to be limited to this form as it is obvious that the exact form of the shields or guards will depend upon the character of the shears, the form of the finger and thumb loops, and the manner in which the shields or guards are attached to or formed with the handle of the shears. I find in practice that shields of this character entirely protect the fingers of the operator from being cut by the tin or other sheet metal, and that they therefore permit better and quicker work to be done than where the handles of the shears are unguarded.

Having described my invention, what I claim is:

1. The combination with a pair of metal shears having handle shanks and loops at the ends, of finger protectors comprising shields attached one to each shank and extending beneath the corresponding finger loop.

2. The combination with a pair of metal shears having handle shanks and loops at the ends, of finger protectors comprising shields attached one to each shank and extending beneath the corresponding finger loop and around the outer side of said finger loop.

3. The combination with a pair of tinners' shears having handle shanks and finger loops, of finger protectors comprising a pair of shields each attached to one of the shanks and extending beneath and in approximate parallel relation to the corresponding loop and extending around the edges of said loop and partially over the loop.

4. The combination with a pair of tinners' shears having handle shanks and finger loops, of finger protectors comprising a pair of shields each attached to one of the shanks and extending beneath and in approximate parallel relation to the corresponding loop and extending around the edges of said loop and partially over the loop, those portions of the shields extending approximately parallel to the finger loops having at all times overlapping relation with each other.

In testimony whereof I hereunto affix my signature in the presence of two witnesses.

THEODORE MOSTER.

Witnesses:
FRANK W. HUEBER,
ANNA L. HUEBER.

Copies of this patent may be obtained for five cents each, by addressing the "Commissioner of Patents, Washington, D. C."